June 4, 1968  R. R. MENDONCA  3,386,762

SEEDLING TRANSPLANTING TOOL

Filed May 2, 1967

*INVENTOR*
ROBERT R. MENDONCA

United States Patent Office 3,386,762
Patented June 4, 1968

3,386,762
SEEDLING TRANSPLANTING TOOL
Robert R. Mendonca, 12672 Morgan Lane,
Garden Grove, Calif. 92640
Filed May 2, 1967, Ser. No. 635,617
2 Claims. (Cl. 294—25)

ABSTRACT OF THE DISCLOSURE

This invention consists of a tube of light gauge spring steel, so constructed that its diameter may readily be changed by the squeezing together of two metal rings secured to the outside periphery of the tube. The bottom of the tube is so configurated as to provide trapezoidal-shaped teeth around its entire periphery, thereby providing means of easily pushing the tool down into the ground. The aforesaid tube is also provided with a plurality of openings in the side thereof just above the toothed edge.

---

It is the principal object of this invention to provide a seedling transplanting tool of the character described, that is pressed down into the soil over the seedling to be removed, removing of the seedling, and then dropping of the seedling into the desired place without any damage to the same.

Another object of this invention is to provide a seedling transplanting tool of the character described that is a simple non-clogging tool that can be used by even the most inexperienced of gardeners and the like.

Still another object of this invention is to provide a seedling transplanting tool of the character described that is so constructed as to require no mechanism whatsoever for the changing of its diameter, a most desirable feature for this kind of tool, as will be realized by anyone experienced in the horticultural art.

Other and further objects and advantages of this invention will no doubt come to mind as this specification and its appended claims are read and the accompanying drawing is examined.

In the drawing.

In the drawing, like parts of this invention are indicated by like reference numbers in the two views of the tool.

Figure 1:
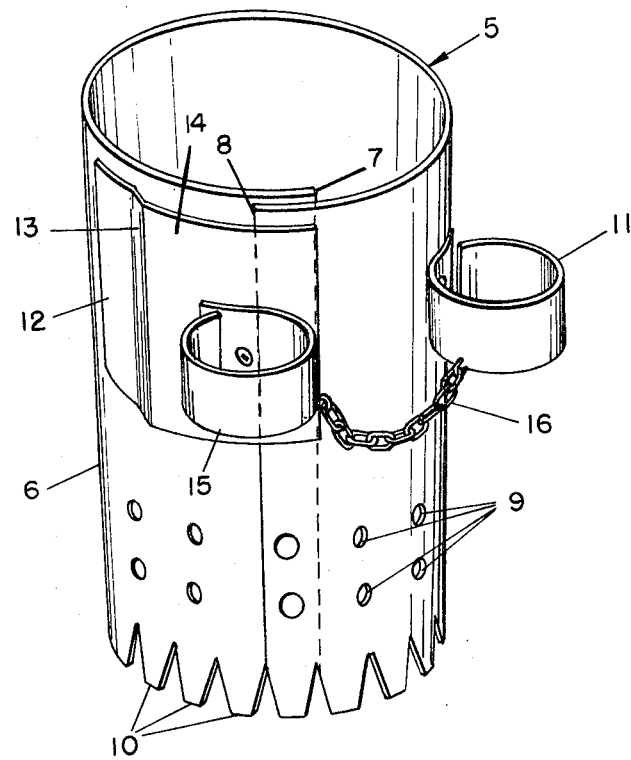
FIG. 1 is a pictorial view of this invention of a seedling transplanting tool.
Figure 2:
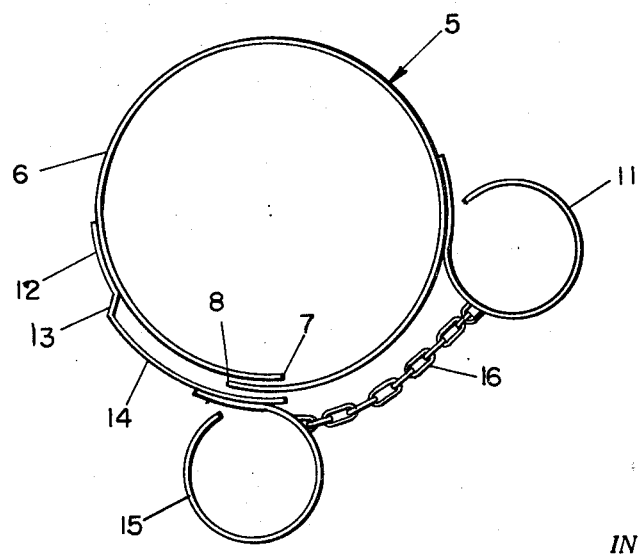
FIG. 2 is a top view of this invention.

The reference number 5 indicates this invention in its entirety.

The invention consists of a tube 6, that is formed of light gauge spring steel having free overlapping edges 7 and 8. The aforesaid tube 6, which is of any desired length, is provided with a plurality of equally spaced openings 9 in the side thereof, as well as trapezoidal-shaped teeth 10 on the lower end of the tube.

A ring 11, that is also made of steel, is suitably secured to the outside of the aforesaid tube 6, as is illustrated in the accompanying drawing. Here it is also seen that this seedling transplanting invention is provided with a steel member 12, suitably secured to the outside of the tube. The steel member 12 is provided with both an offset portion 13 and a body 14, which I call a guide. This guide freely overlaps the aforesaid edge 8 of this invention. A second steel ring, that is indicated in the drawing by the reference number 15, is secured to the aforesaid body 14 of the steel member 12. A chain 16 connects the two rings 11 and 15 together, thereby completing the construction of this seedling transplanting tool.

The tool 5, in its normal or at rest position, as shown in FIGURE 1, makes the opening in the ground that receives the plant. The tool then has its diameter reduced, by pressing the aforesaid rings 11 and 15 together with the fingers, and then pressing down into the soil over the seedling, thus removing the same and planting it in the opening. The tool is then expanded in diameter, thereby dropping the plant. Only in very fine soil is the tool ever pressed while in the at rest position and then squeezed to a smaller diameter, thereby compressing the soil before removing the plant.

The aforesaid openings 9 in this invention serve a dual purpose. They not only serve as a depth gauge, but also weaken the bottom of the tube 6, thus acting as a balancing feature that results in an even squeezing action of the tool since the two rings 11 and 15 are above the vertical center of the tube and above the aforesaid openings 9.

While one can handle this invention in any way one sees fit, the most comfortable way of handling it is as follows: Place the palm of the hand over the top of the tool, then place (if right handed) the thumb in the left hand ring, which is the one indicated in the accompanying drawing by the aforesaid reference number 11, and the index finger in the right hand ring which is noted in the drawings by the reference number 15, or one may reverse the finger positions, thereby placing the tool in front of one's hand.

Only in very hard soil is a twisting motion of the tool ever necessary in order to make an opening in the soil.

It is to be understood that this invention is subject to any changes and/or modifications one may care to make insolong as the changes and/or modifications fall within the scope and intent of the appended claims.

What I now claim as new and desire to secure by Letters Patent is:

1. A seedling transplanting tool of the character described, comprising a variable diameter tube made from light gauge spring steel having its longitudinal edges overlapping one another, the tube having the periphery of one end terminating in a plurality of teeth, each tooth having the configuration of a trapezoid, the tube having a plurality of spaced openings in the lower portion thereof, and means for changing the diameter of the tube, comprising two rings secured in spaced relation to one another on the outside and upper portion thereof, the said rings being connected together by a chain.

2. The invention of claim 1, wherein one of the said rings is secured to the body that is a portion of a steel member having an offset formed longitudinally in the vertical plane therein, the said body overlapping the outside longitudinal edge of the said tube, and the said steel member not only being secured to the outside of the said tube but also above the plurality of openings therein.

References Cited

UNITED STATES PATENTS

| | | | |
|---|---|---|---|
| 2,014,311 | 9/1935 | Council | 294—50.5 |
| 2,428,499 | 10/1947 | Nelson | 294—50.7 |

EDWARD A. SROKA, Primary Examiner.

EVON C. BLUNK, Examiner.

R. D. GUIOD, Assistant Examiner.